June 6, 1944.　　　P. PEGLAÜ　　　2,350,808
JET-PIPE RELAY
Filed March 1, 1940
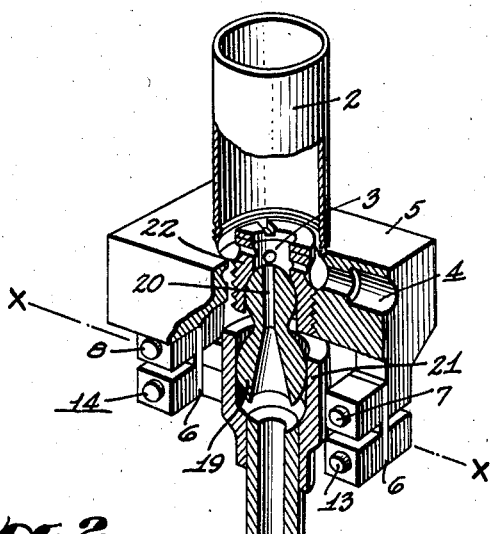
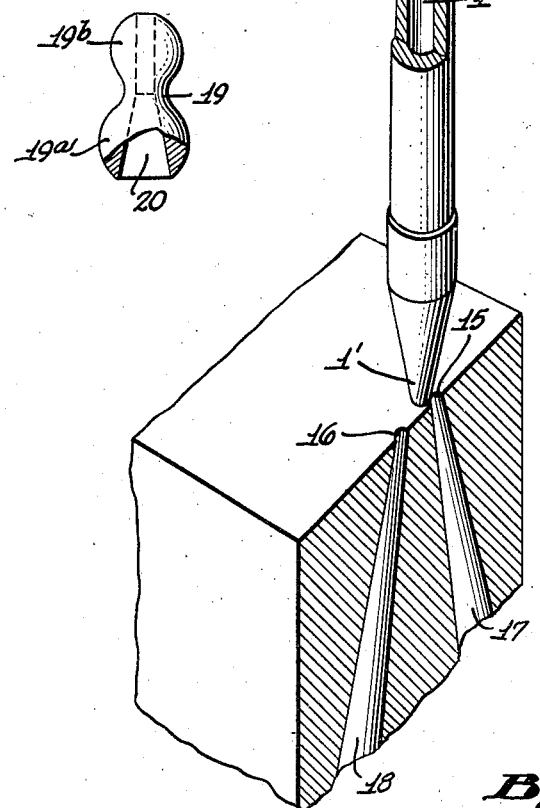
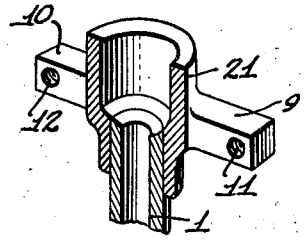
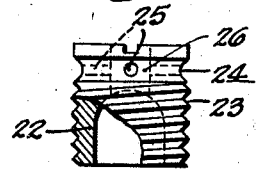
Inventor:
PAUL PEGLAU
By _Attorney._

Patented June 6, 1944

2,350,808

UNITED STATES PATENT OFFICE 2,350,808

JET-PIPE RELAY

Paul Peglau, Berlin-Steglitz, Germany; vested in the Alien Property Custodian

Application March 1, 1940, Serial No. 321,769
In Germany February 24, 1939

1 Claim. (Cl. 285—92)

This invention relates to a jet-pipe relay and deals with the following problem:

As is well known, a jet-pipe relay comprises a jet-pipe supplied with a pressure medium, as for instance compressed air, oil, or the like. The jet-pipe has to be swingably mounted so as to deflect in response to any change of the controlling impulses acting upon the pipe. Obviously, the sensitivity of such a jet-pipe relay is the better, the smaller the friction to be overcome upon any deflection of the pipe. Usually, the pressure medium supply conduit leads to a fixed stationary connecting piece relative to which the jet-pipe is to be moved. Of course it is desirable to provide an adequate packing or gasket means between the fixed connecting piece and the input end of the jet-pipe. The usual packing means are inadequate as they unduly increase the friction with the result that the sensitivity of the jet-pipe relay suffers considerably.

This gives rise to difficulties inasmuch as on the one hand the friction should be kept as small as possible and on the other hand the loss of pressure medium should be reduced as far as possible by improving the packing means hitherto used.

The invention aims at overcoming these difficulties by the provision of a packing body which does not unduly increase the friction and which prevents the jet-pipe relay from leaking.

A further object of my invention is to provide packing means which prevent leakage not only in the middle or zero position but likewise in all position deviations therefrom. In this connection it is to be noted that according to the invention means are provided for adjusting the effective packing body position relative to the (imaginary) axis of the jet-pipe deflection.

Further aims and objects of my invention will be readily understood from the following description of an embodiment shown in the drawing, in which Fig. 1 is a perspective view of the jet-pipe relay showing the packing means in a vertical cross-section;

Fig. 2 is a side elevation on a larger scale of the packing body, partly in section;

Fig. 3 is a side elevation on a larger scale of the adjusting means partly in section;

Fig. 4 is a perspective view partly in section of the input end of the jet-pipe provided with a cup-like casing for receiving the packing body.

Referring now to the drawing, the jet-pipe 1 is supplied in well known manner with any convenient pressure medium delivered by a supply conduit 2 which in the embodiment shown may communicate either with a bore 3 or a channel 4, both provided in a stationary block 5. The supply conduit 2 communicating with any suitable pressure source (not shown) is connected to said block 5 supporting the jet-pipe 1 by means of two leaf springs 6 arranged to allow the pipe to be deflected around an axis $x$—$x$. This provides a practically frictionless bearing for the jet-pipe and said leaf springs furthermore act so as to exert a restoring action on the jet-pipe, so that any further spring means or the like for the restoring action may be dispensed with. In the embodiment shown said leaf springs are fastened at one end to the stationary block 5, e. g. by means of bolts 7 and 8, respectively, and at the other end to the jet-pipe 1. To this purpose, the pipe 1 is provided with two lateral arms 9, 10 having screw threaded bores 11, 12, respectively, for clamping the lower spring end onto said arms by means of bolts 13 and 14.

The bore 3 and the channel 4 communicate with the jet-pipe input end so that the pressure fluid coming from the pressure source enters the jet-pipe 1 and into the discharge nozzle 1', thereby producing a jet which cooperates with two receiving nozzles or openings 15 and 16. Each of these nozzles communicates with two conduits 17 and 18, respectively, leading to a device to be operated in response to any controlling impulse action upon the jet-pipe 1 so as to displace it around the axis $x$—$x$. Thus the conduits 17 and 18 may communicate with the opposite ends of a servomotor cylinder, not shown.

As is well known from the "Askania jet-pipe relay," the pressure in the receiving nozzle 15 is equal to the pressure in the nozzle 16 provided that the jet-pipe 1 is in its middle or zero position, in which the discharge nozzle 1' is situated exactly in the middle between said two receiving openings 15 and 16. As soon as the controlling impulse causes the jet-pipe 1 to leave its zero or middle position due to a displacement around the axis $x$—$x$ in one or the other direction the pressure fluid will flow from the discharge nozzle 1' in a different degree into said openings 15, 16, thereby producing a pressure difference adapted to operate the servo-motor in dependence on the direction and the value of the controlling impulse.

According to my invention, a packing body 19 is arranged between the stationary block 5 and the input end of the jet-pipe 1. This packing body is easily movable in the direction of movement of the jet-pipe axis and comprises according to Fig. 2 two balls 19$a$, 19$b$ of different diameters connected with each other so as to jointly form one body. As may be seen from Figs. 1 and 2, this body is provided with a channel 20 to permit passage of the pressure medium from the conduit 2 to the jet-pipe 1. The upper part 19b of smaller diameter is in the block 5, while the lower part 19a of greater diameter faces the jet-pipe 1, so that the pressure of the pressure medium exerts a reactionary force upwardly on to the packing body so as to force it on to the block 5. The larger part 19a fits with small play in a cup 21 arranged at the input end of the jet-pipe 1. In the case of a hydraulic relay supplied with a pressure liquid, the small play between the packing body and the cup 21 is adapted to form a thin liquid film reducing the friction as well as having an additional sealing effect.

The cup 21 is provided with a cylindrical inner wall as is more particularly apparent from Fig. 4, so that the packing body supported by the block 5 may be raised or lowered in the direction of the longitudinal axis of the jet pipe, i. e., transverse to the axis of deflection $x$—$x$, without interfering with the freedom of the jet pipe deflection, it being understood that the lower ball 19a of the packing body is exclusively maintained in linear contact with said cylindrical inner wall of the chamber 21, regardless of whether it is in the position shown in Fig. 1 or higher or lower down relative to the chamber 21. This serves to ensure the best conditions which exist when the center of the ball 19a lies in the imaginary jet pipe deflection axis $x$—$x$ coinciding with the two leaf springs 6 above referred to.

For this purpose, a bush or sleeve 22 receiving the smaller ball 19b may be adjusted in the direction of the jet-pipe axis in the block 5. Referring particularly to Fig. 3, this bush is provided with an outer screw thread 23 meshing with a screw threaded bore in the block 5. By rotating the bush 22 in the block 5 the effective position of the packing body 19 relative to the cup 21 and the leaf springs 6 may be readily changed. The bush 22 comprises an annular groove 24 communicating by means of a plurality of radial bores 25 with a longitudinal bore 26 in said bush and the channel 20 in order to render possible a communication of the pressure medium supply with the bore 3 or the channel 4, respectively.

An important feature of the packing means herein disclosed is the provision of a packing body including two parts, the lower part 19b having convex sealing surfaces so as to be in only substantially linear contact with an inner cylindrical sealing wall of the cup 21. The other part 19a of the packing body facing with the bush 22 is also shown to have a convex tightening surface. I prefer this embodiment because the packing body upon coming in contact with the upper fitting wall of the bush 22 will not hinder the freedom of the jet-pipe movement in view of the possibility that the packing body may even upon contacting with the fitting wall of the bush 22, maintain a position (forced upon it in any way whatever) by the jet-pipe.

What is claimed is:

In combination in a joint for jet pipe relays, a pressure fluid supply conduit and a swingably mounted jet pipe, a chamber in the outlet end of the supply conduit and a chamber in the input end of the jet pipe, a packing body having a channel for the passage of pressure fluid seated in said chambers and being freely movable therein, said packing body being held in sealing contact with an inner wall of one of said chambers by the pressure of said fluid, said body adjacent the jet pipe end having a convex outer wall to provide only a substantially linear contact with the inner wall of the jet pipe chamber, the packing body and the chamber against which it is held in sealing contact by the pressure fluid being adjustable relative to the axis of deflection of the swingably mounted jet pipe.

PAUL PEGLAU.